United States Patent
Webb et al.

(12) 
(10) Patent No.: US 6,629,329 B1
(45) Date of Patent: Oct. 7, 2003

(54) CONICAL FABRIC SWAB

(75) Inventors: Kristine Y. Webb, Cumming, GA (US); James J. Holley, Alpharetta, GA (US); Stewart F. Scott, Redan, GA (US)

(73) Assignee: Illinois Tool Works, Glenview, IL (US)

( * ) Notice: Subject to any disclaimer, the term of this patent is extended or adjusted under 35 U.S.C. 154(b) by 373 days.

(21) Appl. No.: 09/586,080

(22) Filed: Jun. 2, 2000

(51) Int. Cl.[7] .............................. A47L 1/06; A47L 13/10
(52) U.S. Cl. ........................... 15/209.1; 15/210.1
(58) Field of Search ..................... 15/209.1, 210.1, 15/225

(56) References Cited

U.S. PATENT DOCUMENTS

| | | | |
|---|---|---|---|
| 3,724,018 A | * 4/1973 | Sills | ............ 15/244.1 |
| 5,214,821 A | * 6/1993 | Burrow et al. | ............ 15/209.1 |
| 5,346,287 A | 9/1994 | Burrow et al. | |
| 5,991,960 A | 11/1999 | Johnson | |
| 6,393,651 B1 | * 5/2002 | Forrest et al. | ............ 15/209.1 |

FOREIGN PATENT DOCUMENTS

| | | |
|---|---|---|
| JP | 2000-014615 A1 | 1/2000 |
| WO | WO85/05296 | 5/1985 |

OTHER PUBLICATIONS

Australian Patent Office Search Report Authorized Officer: M.R. Olley Date: Jul. 15, 2002.

\* cited by examiner

Primary Examiner—Robert J. Warden, Sr.
Assistant Examiner—Laura C Cole
(74) Attorney, Agent, or Firm—Mark W. Croll; Donald J. Breh; Welsh & Katz, Ltd.

(57) ABSTRACT

A swab for cleaning electrical and electro-mechanical components includes a handle defining a longitudinal axis and having a cleaning head end and a grasping end. The cleaning head end is formed to define a taper. A fabric cleaning end is formed by forming a fabric around the handle at the taper. A conical cleaning head is formed and is sealed to the handle at a juncture of the cleaning head end and the grasping end to define a circumferential handle seal. The fabric is further sealed along the taper to define a longitudinal seal. A method for making the swab is also disclosed.

8 Claims, 1 Drawing Sheet

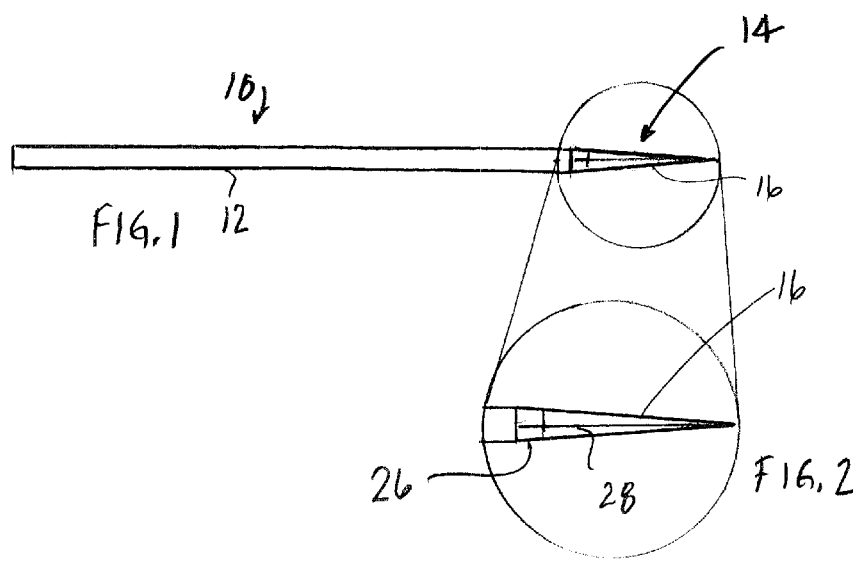
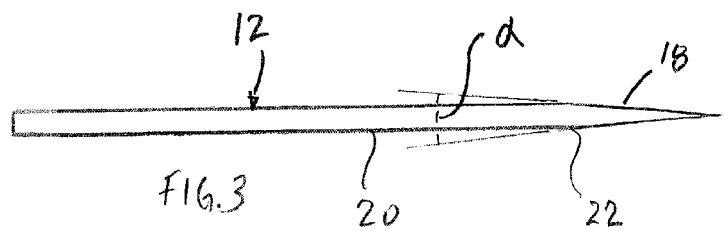
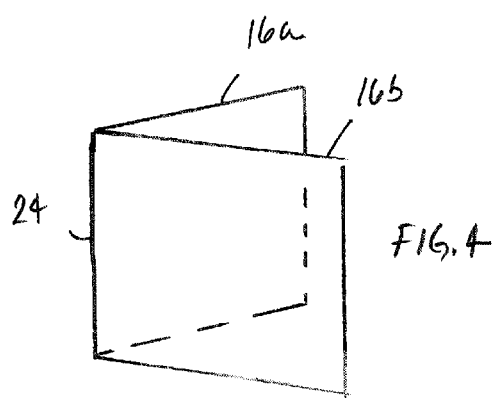
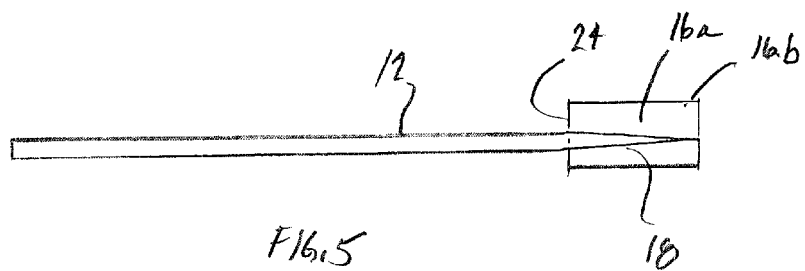

CONICAL FABRIC SWAB

FIELD OF THE INVENTION

This invention pertains to a swab for cleaning. More particularly, the invention pertains to a swab having a conical cleaning head portion formed from a fabric material and a method for making such swabs.

BACKGROUND OF THE INVENTION

Swabs are used in all manners of cleaning. Commonly recognized swabs includes cotton tip swabs used for personal hygiene and care. Swabs, due to their compact and effective nature, have been adopted for use in numerous areas of manufacture and technology. One such area is the manufacture of electrical components and more specifically, the manufacture of, for example, electrical connectors, hard disk drives and like electro-mechanical components.

Many electro-mechanical components, such as hard disk drives involve strictly controlled, high technology manufacturing process. Other electro-mechanical components, such as connectors are manufactured in processes that are not as state-of-the-art, but nevertheless require closely controlled environments to assure that the components are "clean" upon completing manufacture.

A typical hard disk drive or disk storage device includes magnetic or optical read/write media that is mounted to a drive assembly, such as a motor at a hub. A pivotal or moving arm scans the surface of the disk in order to write to or read from the disk. Contact between the read/write head on the pivotal arm with the storage media device must be done in a "clean" environment. This is commonly referred to as a "clean room" within the housing of the drive device.

During the manufacture of such devices, while it is undesirable, there may be light oils, such as fingerprint and other natural skin oils or other debris that is found on or in such parts. As will be recognized by those skilled in the art, debris and oils can significantly degrade or hamper proper functioning and operation of such devices.

Other electro-mechanical devices, such as connectors, may be stationary components that, nevertheless require "clean" manufacturing processes to assure that the components properly function in operation.

Numerous types of cleaning implements have been used with varying degrees of success to maintain these otherwise susceptible areas clean. However, it has been found that many cleaning implements presently available cannot successfully be used to clean very small particulate matter from corners and other areas of adjoining or adjacent surfaces. This is particularly the case where it is not feasible to readily reach into such areas, without undue force, to clean such areas with known implements.

In addition, it has been found that some presently available cleaning implements discharge a relatively high quantity of particulate matter upon use. For example, some foam-type implements have been found to discharge or release foam particulate matter upon use.

Accordingly, there exists a need for a swab-type cleaning device that can be used for cleaning a variety of delicate, high-requirement electrical and electro-mechanical devices. Desirably, such a device is configured so that it can be used to clean narrow or small spaces, such as slots, as well as juncture regions of surfaces or walls. Most desirably, such a cleaning device removes contaminants, including particulate and light oils without leaving any of its own debris, such as particulate or fiber matter.

SUMMARY OF THE INVENTION

A swab for cleaning electrical and electro-mechanical components has a conical or tapered head. The swab includes an elongated handle defining a longitudinal axis. The handle has a cleaning head end and a grasping end. The cleaning head end is formed to define a taper. Preferably, the taper is formed at an angle of about 3 degrees to about 10 degrees, and most preferably about 5 degrees.

The swab includes a fabric cleaning end. The fabric is formed around the handle at the taper to define the conical cleaning head. The fabric is sealed to the handle to define a circumferential handle seal and is further sealed to itself along the taper to define a longitudinal seal. Preferably, the circumferential handle seal is formed at a juncture of the handle taper and the substantially cylindrical grasping portion of the handle.

The fabric can be formed to the handle in a single layer. Alternately, the fabric is formed to the handle in at least two layers, and most preferably, in two layers. When folded to form two layers, the two layers are sealed to one another and define a fold seam or a fold line. Preferably, the fold seam is positioned at about the circumferential handle seal.

In a present embodiment, the fabric is a knit polyester. Alternately, the fabric can be a polyester nylon microfiber material.

A method of forming the swab includes the steps of providing an elongated handle having a longitudinal axis and defining a tapered portion and a cylindrical portion. The method further includes providing a section of fabric, forming the fabric about the handle on the tapered portion, sealing the fabric to the handle to define a circumferential handle seal, and sealing the fabric to itself to define a longitudinal seam seal along the tapered portion.

One method of making the swab includes the steps of folding the fabric to form a two layer region defining a fold line, and positioning the fold line at about a juncture of the tapered portion and the cylindrical portion of the handle.

The circumferential handle seal can be formed by ultrasonic welding. Likewise, the longitudinal seam seal can be formed by ultrasonic welding.

Other features and advantages of the present invention will be apparent from the following detailed description, in conjunction with the appended claims.

BRIEF DESCRIPTION OF THE FIGURES

FIG. 1 is a plan view of a conical fabric swab embodying the principles of the present invention;

FIG. 2 is an enlarged, partial view of the area shown in the circle of the swab of FIG. 1;

FIG. 3 is a plan view of the handle of the swab of FIG. 1;

FIG. 4 is a perspective illustration of a fabric section folded onto itself for forming the cleaning head portion of an alternate embodiment of the swab; and FIG. 5 illustrates the orientation of the folded fabric of FIG. 4 in making the alternate embodiment of the swab.

DETAILED DESCRIPTION OF THE PREFERRED EMBODIMENTS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated and/or described.

Referring to the figures and in particular to FIG. 1, there is shown a conical fabric swab 10 embodying the principles of the present invention. The swab 10 includes, generally, a handle 12 and a cleaning head portion 14. The cleaning head 14 is formed from a fabric 16 that is formed around and sealed to the handle 12.

In a preferred embodiment, the handle 12 has a conical tapered head region 18 and a cylindrical portion 20 defining a grasping end of the handle 12, and defining a juncture, as indicated at 22, therebetween. In this configuration, when the fabric 16 is formed around and secured to the handle 12, it likewise defines a tapered or conical profile. As will be recognized by those skilled in the art, such a profile allows use of the swab 10 for reaching into spaces and areas that otherwise could not be accessed by flat or blunt-end implements.

A preferred fabric 16 for use in the present swab is a knit polyester fabric. Alternately, a polyester nylon microfiber material can be used. The fabric 16 can be affixed to the handle 12 in a variety of manners. In a preferred method, the fabric 16 is affixed to the handle 12 by ultrasonically sealing or welding the fabric 16 both to itself and to the handle 12. The fabric 16 can be applied to or formed around the handle 12 in a single layer.

Alternately, as illustrated in FIG. 4, the fabric 16 is folded onto itself so as to form two layers, namely, an upper layer 16a and a lower layer 16b, defining a fold seam or fold line 24. The fabric 16 can then be sealed to itself. The layered fabric 16 is formed around and sealed at the base of the fabric head 14 to the handle 12, such as by ultrasonic welding, to define a circumferential seal, as indicated at 26. The fabric 16 is also sealed along a longitudinal seam, as indicated at 28, running along the tapered portion 18 of the cleaning head 14. In this embodiment of the swab 10, referring to FIG. 5, the folded portion or seam 24 formed by folding the fabric 16 is positioned at the handle seal 26. In this manner, a high degree of assurance is maintained that no fabric fibers will be released from the swab 10.

In a most preferred embodiment, the handle 12 and thus the cleaning head 14 are tapered to define an angle α of about 3 to about 20 degrees. Preferably the taper is formed at an angle of about 5 degrees to about 10 degrees, and most preferably about 5 degrees. However, the angle α can be varied as required, which variations in angle are within the scope of the present invention.

It has been observed that the present conical fabric swab 10 is "cleaner" than foam swabs. That is, whereas foam swabs may tend to release particulate matter during use, it has been found that the present conical fabric swab 10 has a much lower level of particulate release matter.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A swab, comprising:

a handle defining a longitudinal axis, the handle being elongated and having a cleaning head end and a grasping end, the cleaning head end formed to define a taper, the taper being formed at an angle of about 3 degrees to about 20 degrees; and a fabric cleaning end, the fabric being formed around the handle at the taper to define a conical cleaning head, the fabric being sealed to the handle to define a circumferential handle seal, the fabric being sealed to itself along the taper to define a longitudinal seal extending along essentially an entire length of the cleaning end, the fabric cleaning end being formed around the handle in a non-overlapping wrapped manner.

2. The swab in accordance with claim 1 wherein the fabric is formed to the handle in a single layer.

3. The swab is in accordance with claim 1 wherein the fabric is formed to the handle in at least two layers.

4. The swab in accordance with claim 3 wherein the fabric is folded to form two layers, the two layers being sealed to one another and defining a folded seam, and wherein the fold seam is positioned at about the circumferential handle seal.

5. The swab in accordance with claim 1 wherein the circumferential handle seal is formed at a juncture of the handle taper and a substantially cylindrical portion of the handle.

6. The swab in accordance with claim 1 wherein the fabric is a knit polyester.

7. The swab in accordance with claim 1 wherein the fabric is a polyester nylon microfiber material.

8. The swab in accordance with claim 1 wherein the taper is formed at an angle of about 5 degrees to about 10 degrees.

\* \* \* \* \*